United States Patent [19]

Wang et al.

[11] Patent Number: 4,626,642

[45] Date of Patent: Dec. 2, 1986

[54] MICROWAVE METHOD OF CURING A THERMOSET POLYMER

[75] Inventors: Chen-Shih Wang, Troy; Darrel S. Nelson, Warren, both of Mich.

[73] Assignee: General Motors Corporation, Detroit, Mich.

[21] Appl. No.: 785,511

[22] Filed: Oct. 8, 1985

[51] Int. Cl.$^4$ .............................................. H05B 6/80
[52] U.S. Cl. ....................... 219/10.55 M; 219/10.55 F; 219/10.55 R; 264/26; 156/272.4; 156/275.3
[58] Field of Search ............... 219/10.55 M, 10.55 R, 219/10.55 F, 10.55 D, 10.55 E, 10.53; 264/25, 26, 27; 156/272.2, 272.4, 273.7, 275.3, 379.6, 379.7

[56] References Cited

U.S. PATENT DOCUMENTS

| | | | |
|---|---|---|---|
| 3,469,053 | 9/1969 | Levinson | 219/10.55 E |
| 3,957,694 | 5/1976 | Bolon et al. | 252/514 |
| 3,972,967 | 8/1976 | Sayles | 264/3 R |
| 4,011,197 | 3/1977 | Lee | 260/46.5 R |
| 4,018,642 | 4/1977 | Pike et al. | 219/10.55 M X |
| 4,035,216 | 7/1977 | Immel | 219/10.53 X |
| 4,035,547 | 7/1977 | Heller, Jr. et al. | 219/10.53 X |
| 4,219,361 | 8/1980 | Sutton et al. | 219/10.55 M X |
| 4,529,856 | 7/1985 | Meek et al. | 219/10.55 M |
| 4,559,429 | 12/1985 | Holcombe | 219/10.55 R X |

*Primary Examiner*—Philip H. Leung
*Attorney, Agent, or Firm*—R. W. Tung

[57] ABSTRACT

A method of rapidly curing a thermoset polymer by blending and dispersing a quantity of electrically conductive fibers into the polymer and subjecting it to microwave radiation.

2 Claims, No Drawings

MICROWAVE METHOD OF CURING A THERMOSET POLYMER

FIELD OF THE INVENTION

This invention generally relates to a method of curing a thermoset polymer and, more particularly, relates to a method of curing a thermoset polymer filled with electrically conductive fibers.

BACKGROUND OF THE INVENTION

With the increasing usage of reinforced plastics in automotive appearance panels and support structures, the use of polymeric based thermoset adhesives to assemble these components together is also increasing. One major difference exists between the technique of assembling automotive components together by mechanical means and that of the adhesive means. A thermoset adhesive which is generally used for its structural strength requires a relatively long period of time to cure in order to reach its bond strength. A common practice used in the automotive industry in curing a polymeric based thermoset adhesive is to cure by exposure to forced hot air. The time required to cure an adhesive assembled automotive assembly by forced hot air can be extensive, i.e., in the order of 10 to 20 minutes or longer.

The long cure time required for adhesive assembled automotive parts presents a hindrance to the further development of such applications. Prolonged cure time results in the necessity of having large cure ovens and large storage facilities which are not permitted in a mass production process. Others have proposed methods for curing thermoset adhesives by subjecting them to radiations such as microwave or dielectric power. However, these techniques normally require chemical modification of the adhesive such that the end groups on the molecules are able to participate in crosslinking reactions. Furthermore, even with the conventional microwave heating technique, the time required for curing is still in the order of minutes.

It is therefore a general object of the present invention to provide a method of rapid curing a polymeric based thermoset adhesive so that it is compatible with a mass production process.

It is another object of the present invention to provide a method of rapid curing a polymeric based thermoset adhesive at low cost.

SUMMARY OF THE INVENTION

The present invention is carried out by blending and dispersing into a polymeric based thermoset adhesive a quantity of electrically conductive fibers. A plastic assembly assembled by such adhesive is then placed in a microwave field and subjected to microwave radiation. Sufficient electrical energy is induced in the fibers so that heat is rapidly generated and transferred to the adhesive to initiate curing.

This microwave method significantly reduces the curing time normally required for a thermoset adhesive from an order of minutes to an order of seconds. Moreover, an adhesive joint equivalent in bond strength and bond quality to that obtained by a conventional forced hot air heating method is achieved.

DETAILED DESCRIPTION OF PREFERRED EMBODIMENTS

We have discovered that when electrically conductive fibers are added to a polymeric based thermoset adhesive, even at a low content, the cure of such adhesive is greatly accelerated when subjected to microwave radiation. The electrically conductive fibers we have used in the present invention are steel fibers and aluminum fibers. However, other electrically conductive fibers such as graphite fibers should work equally well.

The type of steel fibers and aluminum fibers we have used can be readily obtained from any machine shop as a waste product. Some physical properties of our steel fibers and aluminum fibers are listed in table 1. Data on steel powder and aluminum powder are also included in table 1 for comparison. It is to be noted that the steel fibers we used have a larger length to diameter ratio and a smaller diameter than that of the aluminum fibers used.

TABLE 1

| Filler | Average Length/Diameter | Average Diameter, micron |
| --- | --- | --- |
| Steel fibers | 22 | 30 |
| Steel powder | 1 | 40 |
| Aluminum fibers | 14 | 120 |
| Aluminum powder | 1 | 20 |

The adhesive used in the present invention is a two-part epoxy adhesive commercially available from Quantum Composites, Inc., designated as QCI-5250-AB. We have found that it is an important consideration in the selection of a thermoset adhesive that the cure rate of the adhesive must be compatible with the heating rate of the electrically conductive fibers. For instance, in the case of graphite fibers, a thermoset adhesive of much faster cure rate must be used because graphite fibers can be heated at a much faster rate than either steel fibers or aluminum fibers. A fast cure adhesive must be used in order to absorb the rapidly generated heat to avoid the overheating, or charring, of the adhesive. Alternatively, a pulse-type microwave source instead of a continuous microwave source can be used to control the heating rate of such fast heating fibers.

Our microwave source is a 650 watt domestic kitchen microwave oven operated at 2450 megahertz. Other microwave sources of suitable power and frequencies may work equally well in the practice of our invention.

The plastic parts we bonded with the epoxy adhesive are panels molded of sheet molding compound (SMC). Sheet molding compound material is commonly used in the automotive industry in the molding of body panels. To show the effectiveness of our microwave method, cure developments of epoxy adhesive bonded SMC sample strips heated in the 650 watt microwave oven for various lengths of time are monitored. The cure levels of these microwave cured samples are calculated by comparing their bond strengths with those determined from corresponding control samples.

The control samples used are molded of the same SMC material and bonded by the same epoxy adhesive. They are cured at 67 degrees Celsius in a forced hot air oven for 10 minutes. Lap shear tests were conducted according to ASTM D-1002 (1.27 millimeter per minute speed) in an Instron machine to determine bond strength of all samples.

For comparison purposes, lap shear samples were also prepared using the same epoxy adhesive but without the addition of any electrically conductive fibers. The effect of microwave heating on the cure developments of these samples is shown in table 2.

TABLE 2

| Time in Microwave Seconds | Cure Level % |
|---|---|
| 10 | 10 |
| 90 | 78 |
| 112 | 100 |

It is seen that, using the conventional microwave heating technique, the epoxy adhesive without additives needs to be heated in a microwave for 112 seconds to develop a bond strength of 100% cure, equivalent to that of a hot air cured control sample for 10 minutes at 67 degrees Celsius.

The practice of our invention can be illustrated by, but not limited to, the following two examples.

EXAMPLE 1

Epoxy Filled With Steel Fibers

The effect of the addition of electrically conductive steel fibers in epoxy adhesive on the cure rate by microwave heating is shown in table 3. The samples were cured in a 650 watt microwave oven for 10 seconds. The steel fibers were blended with the adhesive by hand mixing.

TABLE 3

| Steel Concentration wt % | Cure Level % |
|---|---|
| 7.5, fiber | 38 |
| 15.0, fiber | 45 |
| 30.0, fiber | 56 |
| 45.0, fiber | 96 |
| 30.0, powder | 18 |

The results show that the addition of electrically conductive steel fibers in the epoxy adhesive significantly shortens the required microwave heating time. For instance, the epoxy adhesive filled with 45 weight percent steel fibers is almost completely cured (96 percent cure level) in 10 seconds. This is compared favorably to a 112 seconds cure time required to reach the same level of cure for an epoxy adhesive without the additive (table 1). Furthermore, even at a low fiber concentration, i.e., 7.5 weight percent, a cure level of 38 percent was achieved in 10 seconds.

Datum on steel powder filled epoxy adhesive is also included in table 3 for comparison purposes. It is important to note that at 30 weight percent steel powder molding, the adhesive was cured to only 18 percent cure level in 10 seconds. This is compared with a 56 percent cure level achieved by the same epoxy adhesive filled with 30 weight percent steel fibers. These results indicate that accelerated curing is achieved only by the addition of electrically conductive fillers having large aspect ratios (length to diameter ratios), i.e., fibers.

Table 4 shows data obtained on epoxy adhesive samples filled with a low level of steel fibers of 7.5 weight percent. It indicates that at 7.5 weight percent steel fibers, the epoxy adhesive is fully cured in a 650 watt microwave oven in about 42 seconds. This represents a 62 percent reduction in cure time when compared to the 112 seconds microwave heating time necessary for the epoxy sample without steel fibers.

TABLE 4

| Time in Microwave Seconds | Cure Level % |
|---|---|
| 10 | 38 |
| 20 | 58 |
| 30 | 71 |
| 42 | 100 |

EXAMPLE 2

Epoxy Filled With Aluminum Fibers

The advantage of the present invention can also be demonstrated by an epoxy adhesive filled with aluminum fibers. The results, as shown in table 5, were obtained from lap shear samples cured for 10 seconds in the same microwave oven. The effect of aluminum fibers on the curing of epoxy adhesive is similar to that seen in samples filled with steel fibers.

TABLE 5

| Aluminum Concentration wt % | Cure Level % |
|---|---|
| 7.5, fiber | 45 |
| 15.0, fiber | 42 |
| 45.0, fiber | 96 |
| 45.0, powder | 41 |

To demonstrate that the fibers used in the adhesive must be electrically conductive in order to accelerate curing, data were obtained on samples bonded by the same epoxy adhesive but filled with nonelectrically conductive glass and nylon fibers. Results obtained on samples cured for 10 seconds in the same 650 watt microwave are shown in table 6. When compared to data contained in table 2, it is evident that no significant acceleration of the curing process was effected by the addition of these nonelectrically conductive fibers.

TABLE 6

| Fiber Fillers wt % | Cure Level % |
|---|---|
| glass, 30 | 20 |
| nylon, 7.5 | 14 |

While the heating mechanism of these electrically conductive fibers embedded in the adhesive is not known with certainty, a possible explanation is that the conductive fibers are heated by induction, i.e., eddy currents generated by the microwave field flowing through the conductive fibers. These eddy currents in turn cause rapid heating of the fibers. In other words, countless numbers of minute line resistance heaters are formed when steel fibers embedded in the epoxy adhesive are heated by the microwave radiation. These minute line resistance heaters supply sufficient thermal energy to the adhesive to activate the curing process. It must be noted that even though we have demonstrated our invention on an epoxy adhesive, these electrically conductive fibers can be added to any kind of polymeric based thermoset adhesive that requires cure, i.e., for instance, any kind of one or two parts epoxy, phenolic, elastomeric or other thermoset adhesives.

While our invention has been described in terms of two preferred embodiments thereof, it is to be appreciated that those skilled in the art will readily apply these teachings to other possible variations of the invention.

The embodiments of the invention in which an exclusive property or privlege is claimed are defined as follows:

1. A method of rapid curing a thermoset polymer used as an adhesive in the bonding of automotive plastic components comprising the steps of:

blending and dispersing into said thermoset polymer less than sixty weight percent of total weight electrically conductive metal fibers selected from the group consisting of steel and aluminum, said fibers having a minimum average aspect ratio of 5 and a maximum average diameter of 500 microns, bonding said automotive plastic components together with said fiber containing thermoset polymer adhesive and clamping under sufficient pressure such that said automotive plastic components are in intimate contact with said fiber containing thermoset polymer adhesive, establishing a field of microwave energy for a time period of at least 10 seconds across the thermoset polymer for inducing sufficient electrical energy in said fibers such that heat is generated to rapidly cure said thermoset polymer and bond said automotive plastic components together.

2. A method of rapid curing a thermoset adhesive comprising the steps of:

blending and dispersing into said thermoset adhesive a quantity of electrically conductive fibers having a minimum average aspect ratio of 5 and a maximum average diameter of 500 microns, establishing a field of microwave energy across the thermoset adhesive for inducing sufficient electrical energy in said fibers such that heat is generated to rapidly cure said thermoset adhesive.

* * * * *